(No Model.)
E. R. FELLOWS.
CUTTER AND CUTTER HEAD FOR GEAR SHAPING MACHINES.
No. 579,570.   Patented Mar. 30, 1897.
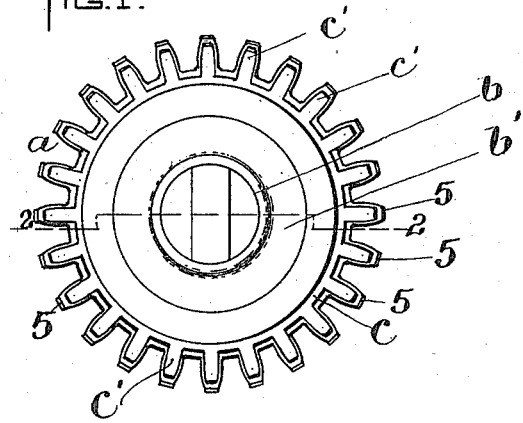
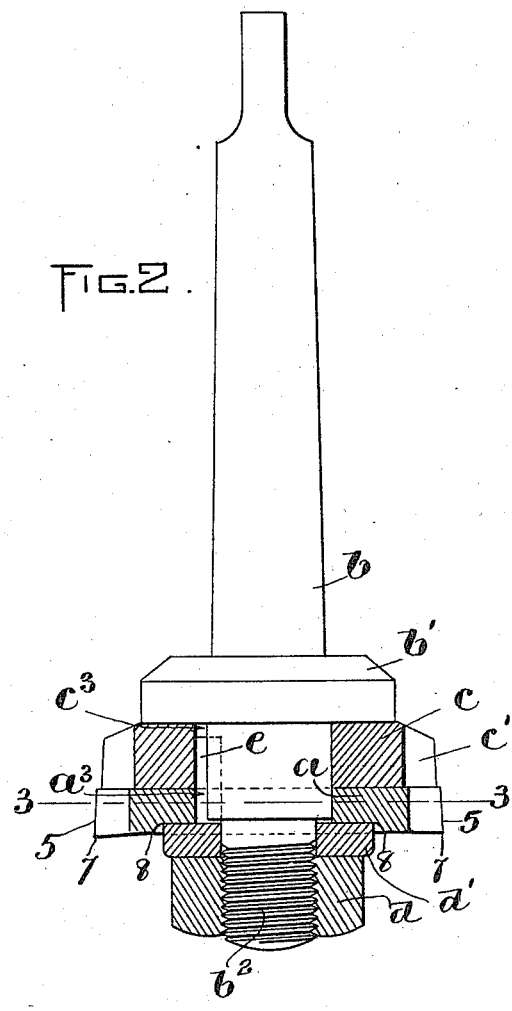
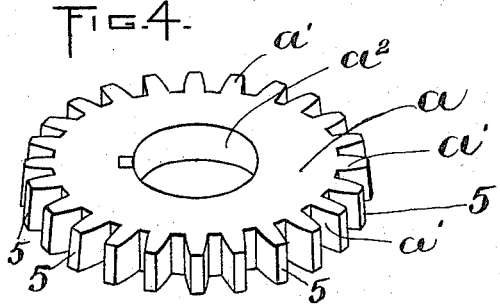
WITNESSES:
E Batchelder
P. W. Pezzetti
INVENTOR:
Edwin R. Fellows
by Knight Brown & Quinby
attys

UNITED STATES PATENT OFFICE.

EDWIN R. FELLOWS, OF SPRINGFIELD, VERMONT.

CUTTER AND CUTTER-HEAD FOR GEAR-SHAPING MACHINES.

SPECIFICATION forming part of Letters Patent No. 579,570, dated March 30, 1897.

Application filed August 15, 1896. Serial No. 602,843. (No model.)

*To all whom it may concern:*

Be it known that I, EDWIN R. FELLOWS, of Springfield, in the county of Windsor and State of Vermont, have invented certain new and useful Improvements in Cutters and Cutter-Heads for Gear-Shaping Machines, of which the following is a specification.

This invention has for its object to provide a gear-shaping cutter adapted to act on a gear-blank simultaneously at a plurality of points and to generate the curves of gear-teeth on the blank, the operation of generating the curves of a plurality of teeth being simultaneously carried on.

The invention consists, first, in a metal-planing cutter formed as a bevel-gear the teeth of which constitute metal-planing cutters, the cutting edges of which are at the ends of the teeth, the backs of the teeth being formed at a slight angle with the axis of the cutter to give the teeth the clearance of metal-planing tools.

The invention also consists in a cutter-head for holding a cutter of the character above specified, said head comprising a shank, a clamping or cutter-supporting member rigidly supported by said shank and having projections coinciding with the teeth of the gear-shaped cutter above specified, but of smaller area than said teeth, so that said projections support the strain exerted on the teeth without coming in contact with the surfaces generated thereby, and an adjustable clamping member which coöperates with the said rigidly-supported clamping member in holding the cutter.

Of the accompanying drawings, forming a part of this specification, Figure 1 represents a top view of a cutter and cutter-head embodying my invention. Fig. 2 represents a section on line 2 2 of Fig. 1. Fig. 3 represents a section on line 3 3 of Fig. 2. Fig. 4 represents a perspective view of the gear-shaped cutter.

The same letters and numerals of reference indicate the same parts in all the figures.

In an application for Letters Patent of the United States filed by me March 31, 1896, Serial No. 585,587, I show a gear-shaping machine in which are combined a metal-planing cutter having a circular series of radiating or outwardly-projecting gear-shaped metal-planing teeth, a blank holder or support, means for reciprocating one of said parts to cause the cutter to plane the blank across its edge, and means for changing the relative positions of said parts to cause the teeth to act successively at different points on the blank and generate the curves of gear-teeth thereon.

My present invention relates to a cutter adapted for use as an element of the combination above specified, said cutter being preferably mounted to rotate on its own axis in a carrier which is reciprocated to move the cutter back and forth crosswise of the blank, while the blank-holder is adapted to be rotated to bring different parts of the edge of the blank successively into position to be acted on by the teeth of the cutter.

In carrying out my present invention I provide a multiple cutter which is composed of a circular body $a$ and a series of teeth $a'$, radiating therefrom, said body and teeth resembling in form a narrow bevel-gear the teeth of which have but a slight angle with the axis of the cutter to give the backs 5 of the teeth or individual cutters the clearance of ordinary metal-planing tools, the back 5 of each tooth having an inclination of about one-half of one degree with the cutter-axis. In Fig. 4 I have shown the inclination of the backs of the teeth considerably exaggerated, the actual inclination being hardly perceptible in a drawing.

The cutting or acting portions of the teeth are formed at the larger end or side of the body $a$, and to give said teeth the rake of metal-planing tools I prefer to bevel or dish the said larger side from 7 to 8, thus forming an annular surface which stands at a slightly-acute angle with the backs 5. I do not limit myself to this formation, however, as the said annular surface 7 8 may form a right angle with the backs 5, if desired. The body $a$ has a central orifice $a^2$, which receives a portion of the shank $b$, whereby the cutter is secured to its carrier or holder. The said shank is provided with a shoulder $b'$ at one side of the cutter and with a threaded portion $b^2$ at the opposite side of the cutter. Between the shoulder $b'$ and the cutter is interposed the cutter-support $c$, which is preferably a plate of the general form of the cutter, detachably mounted on the shank and rigidly backed or supported by the shoulder $b'$. The support $c$ has a series of radiating projections $c'$, corresponding in form to the teeth $a'$, but slightly smaller in area, said projections supporting the rear or upper ends of the teeth against the strain exerted upon them while they are in operation without coming in contact with the surfaces formed by said teeth on the gear-blank, the projections $c'$ following the teeth into the blank.

$d$ represents a clamping-nut which is engaged with the threaded portion of the shank $b$ and may either bear directly upon the under surface of the cutter-body $a$ or upon an interposed plate or washer $d'$, which in turn bears upon the under surface of the cutter-body. It will be seen that when the nut $d$ is turned tightly to place it coöperates with the support $c$ in clamping the cutter and holding it securely in place upon the shank. To prevent independent rotation of the support $c$ and the cutter-body $a$ and to preserve the proper relation of the projections $c'$ and teeth $a'$, I provide the cutter-body $a$ and support $c$ with coinciding grooves $a^3$ $c^3$, which receive a spline $e$, the shank $b$ having also a groove which coincides with the grooves $a^3$ $c^3$ and receives one side of the spline, so that the shank-support and cutter-body are securely locked together.

It will be seen that the support $c$ and nut $d$ constitute clamping members, relatively adjustable, to detachably secure the cutter to the shank, the cutter being readily removable and interchangeable with other cutters, so that cutters of different shapes and sizes may be used with the same shank. The detachability of the support $c$ enables a different support to be used for each size or shape of cutter. The shank and the clamping members thereon, one of said members having radiating projections arranged to support the rear ends of the cutter-teeth, constitute an improved cutter head or holder, which forms a part of my invention.

The described cutter-head and cutter may be used with an organized machine constructed substantially as shown in my above-mentioned application, with the exception that the carrier or holder to which the shank $b$ is secured is arranged to hold the axis of said shank at right angles with the axis of the blank-holder instead of at an inclination thereto, as shown in said application.

I do not limit myself to the support $c$ made as a separate piece detachable from the shank, as said support may be integral with or rigidly attached to the shank. The cutter $a$ and support $c$ may be clamped directly to the end of a suitable rotary shaft instead of being clamped to the tapered spindle $b$, in which case the shoulder $b'$ would be the end of the cutter-shaft.

It will be seen that the teeth $a'$ are of uniform size and shape and that their sides are formed to generate the curves of gear-teeth, the cutter-teeth being also arranged in a continuous circular series, so that the cutter operates continuously in generating the curves of gear-teeth on a blank when the cutter is given a back-and-forth endwise movement across the blank and the cutter and blank are rotated step by step, each on a fixed axis, or when the blank is given a planetary motion about the cutter, the latter having no rotary movement, all as described in my application for Letters Patent of the United States filed March 31, 1896, Serial No. 585,587. A single cutter is therefore enabled to generate the curves of gear-teeth on blanks of different sizes, as described in said application.

I claim—

1. A metal-planing cutter having outwardly-projecting or radiating metal-planing teeth, the backs of which are formed at a slight clearance-angle with the axis of the cutter, while their sides are formed to generate the curves of gear-teeth when the cutter and gear-blank are relatively moved as described, said cutter-teeth being of uniform size and shape and arranged in a continuous circular series, whereby the cutter is enabled to operate continuously in generating the curves of gear-teeth on blanks of different sizes, as set forth.

2. A metal-planing cutter having outwardly-projecting or radiating metal-planing teeth, the backs of which are formed at a slight clearance-angle with the axis of the cutter, said teeth being of uniform size and shape and arranged in a continuous circular series, combined with a shank adapted for engagement with a cutter-operating device or mechanism and having provisions for detachably holding or clamping the cutter, said shank having its axis coincident with the axis of the cutter.

3. A metal-planing cutter comprising a hub or body having a central orifice and a continuous circular series of outwardly-projecting metal-planing teeth, the backs of which have a slight clearance-angle; combined with a shank or spindle formed to removably enter said orifice and having a shoulder at the rear side of the cutter; an inner clamping member or plate perforated to receive the shank and supported by said shoulder at the rear side of the cutter, said member having projections coinciding with the teeth of the cutter; an outer clamping member adjustably connected with the shank and adapted to engage the outer side of the cutter; and means for locking the inner clamping member and cutter together to prevent independent rotary movement of either.

4. The combination of a gear-shaped metal-planing cutter, having a central orifice and a groove communicating therewith; a shank having a shoulder and a threaded portion; a detachable supporting or clamping member rigidly backed by said shoulder, and provided with projections coinciding with the cutter-teeth, and with a central orifice and groove coinciding with the orifice and groove of the cutter; a clamping-nut engaged with the threaded portion of the shank; and an annular plate or washer interposed between the nut and cutter and provided with a pin or spline.

In testimony whereof I have signed my name to this specification, in the presence of two subscribing witnesses, this 7th day of August, A. D. 1896.

EDWIN R. FELLOWS.

Witnesses:
JAMES HARTNESS,
ERWIN E. WOOD.